United States Patent [19]

Sherif

[11] Patent Number: 4,999,066

[45] Date of Patent: Mar. 12, 1991

[54] PROCESS FOR BONDING TILES TO SUBSTRATE USING MAGNESIUM PHOSPHATE COMPRISING ACTIVATOR PREPARED BY MIXING INERT POROUS MATERIAL WITH LIQUID $P_2O_5$ MATERIAL

[75] Inventor: Fawzy G. Sherif, Stony Point, N.Y.

[73] Assignee: Stauffer Chemical Company, Shelton, Conn.

[21] Appl. No.: 914,917

[22] Filed: Oct. 3, 1986

Related U.S. Application Data

[63] Continuation-in-part of Ser. No. 788,664, Oct. 17, 1985, Pat. No. 4,755,227, and a continuation-in-part of Ser. No. 896,709, Nov. 3, 1986, and a continuation-in-part of Ser. No. 908,878, Sep. 15, 1986, and a continuation-in-part of Ser. No. 787,407, Oct. 15, 1985, said Ser. No. 788,664, is a continuation of Ser. No. 617,317, Jun. 7, 1984, abandoned, which is a continuation-in-part of Ser. No. 522,077, Aug. 11, 1983, abandoned, said Ser. No. 896,709, is a continuation-in-part of Ser. No. 736,015, May 20, 1985, abandoned, said Ser. No. 908,878, is a continuation-in-part of Ser. No. 735,918, May 20, 1985, abandoned.

[51] Int. Cl.$^5$ ............................................. E04B 2/00
[52] U.S. Cl. .................................. 156/71; 52/389; 52/390; 52/746; 106/690; 106/691; 106/815; 156/298; 156/299; 156/325; 501/111

[58] Field of Search ............... 156/71, 299, 298, 325; 52/389, 746, 390; 106/121; 501/111

[56] References Cited

U.S. PATENT DOCUMENTS

| | | | |
|---|---|---|---|
| 3,468,750 | 9/1969 | Pfeifer et al. | 156/325 |
| 3,475,188 | 10/1969 | Woodhouse et al. | 501/111 |
| 3,960,580 | 6/1976 | Stierli et al. | 501/111 |
| 4,324,592 | 4/1982 | Patel et al. | 106/121 |
| 4,505,752 | 3/1985 | Sherif et al. | 501/111 |
| 4,522,855 | 6/1985 | Bethea | 156/71 |

*Primary Examiner*—John J. Gallagher
*Attorney, Agent, or Firm*—Paul J. Juettner

[57] ABSTRACT

A fast-setting magnesium phosphate one-component adhesive/grout is used to bond tiles, e.g. ceramic tiles, to a substrate, e.g. sheet-rock. The grout comprises an activator prepared by e.g., mixing diatomaceous earth with at least a sufficient amount of an ammonium phosphate solution to form a paste then heating the paste to coat the pores of the diatomaceous earth and result in a dry solid which is then milled to yield the activator, magnesium oxide, diammonium phosphate, boric acid, and sufficient water to form a paste. This grout is applied to the surfaces to be bonded which are then brought together to form a composite which is allowed to set at ambient temperatures forming a durable bond in about three hours.

10 Claims, No Drawings

PROCESS FOR BONDING TILES TO SUBSTRATE USING MAGNESIUM PHOSPHATE COMPRISING ACTIVATOR PREPARED BY MIXING INERT POROUS MATERIAL WITH LIQUID $P_2O_5$ MATERIAL

CROSS REFERENCE TO RELATED APPLICATIONS

This application is a continuation-in-part of U.S. application Ser. No. 06/788,664, filed Oct. 17, 1985, now U.S. Pat. No. 4,755,227 which is a continuation of abandoned U.S. application Ser. No. 06/617,317, filed Jun. 7, 1984, which is a continuation-in-part of abandoned U.S. application Ser. No. 06/522,077, filed Aug. 11, 1983. This application is also a continuation-in-part of U.S. application entitled IMPROVED MAGNESIUM PHOSPHATE FAST-SETTING CEMENT, U.S. Ser. No. 06/896,709, filed Aug. 15, 1986 by Fawzy G. Sherif et al., which is a continuation-in-part of U.S. application Ser. No. 06/736,015, filed May 20, 1985, now abandoned. This application is also a continuation-in-part of U.S. application entitled MAGNESIUM PHOSPHATE FAST-SETTING CEMENTITIOUS COMPOSITIONS CONTAINING SET RETARDANTS, U.S. Ser. No. 06/908,878, filed Sept. 15, 1986 by Fawzy G. Sherif, which is a continuation of U.S. application Ser. No. 06/735,918, filed May 20, 1985, now abandoned. This application is also a continuation-in-part of U.S. application Ser. No. 06/787,407, filed Oct. 15, 1985.

BACKGROUND OF THE INVENTION

1. Field of the Invention

This invention relates to a fast-setting magnesium phosphate one-component adhesive/grout. More particularly, it relates to a process for bonding tiles to a substrate using a fast-setting magnesium phosphate adhesive/grout.

2. Related Information

Fast-setting magnesium phosphate (cementitious compositions) comprising generally a phosphate entity and a magnesium entity which set in the presence of water to form a monolithic solid is generally well-known. However, the use of an advanced magnesium phosphate fast-setting one-component adhesive/grout of the type used in this invention is not disclosed in the art.

There are two types of grout manufactured today, cement-based and resin-based. Cement-based grouts usually contain hydraulic cement, sand and other ingredients to compensate for plastic and/or hardened shrinkage. The second type of grout is resinous in composition and relies on a thermosetting chemical reaction. This type is often referred to as an epoxy grout. These epoxy grouts must be prepackaged, pre-measured systems to avoid costly failures. Each epoxy system has a unique viscosity requiring tailoring of a blended aggregate for that system. However, epoxy grouts demonstrate the following advantages over cement-based materials: higher impact and vibration resistance; greater chemical resistance; higher strength; and increased bond strength.

Co-pending U.S. application Ser. No. 788,664 filed Oct. 17, 1985, which is a continuation of U.S. application Ser. No. 617,317 filed Jun. 7, 1984, which is a continuation-in-part of U.S. application Ser. No. 522,077 filed Aug. 11, 1983, discloses a unique fast-setting magnesium phosphate cementitious composition. In this composition, the phosphate entity is a liquid $P_2O_5$-containing solution, e.g. an ammonium phosphate solution, absorbed onto an inert material, e.g. diatomaceous earth. However, this co-pending U.S. application does not disclose the unique process for bonding tiles to substrates as disclosed herein.

SUMMARY OF THE INVENTION

An object of this invention is to provide a process for bonding tiles to a substrate in which the one-component grout is fast-setting, water and fire resistant, odorless, non-toxic and is particularly adapted for use with ceramic and mosaic tiles.

Other objects and advantages of the present invention are described elsewhere within this specification.

This invention is a process for bonding tiles to a substrate which comprises: (a) preparing a cementitious phosphate composition comprising: (i) an activator prepared by mixing an inert porous material, e.g., diatomaceous earth, with a sufficient amount of a liquid $P_2O_5$-material, e.g., an ammonium phosphate solution, to at least form a paste followed by heating the resulting material to yield a dry solid which can optionally be milled to yield the activator; (ii) a source of magnesium, e.g., magnesium oxide, (iii) an optional amount of diammonium phosphate, (iv) an optional amount of boric acid, and (v) sufficient water to form a paste; (b) applying the magnesium phosphate composition to either the tile or substrate or both; and then (c) bringing together the tile and substrate with the cementitious composition therebetween to bond the tile to the substrate and allowing the cementitious composition to set at ambient temperatures.

In this process the tile is preferably ceramic and the substrate preferably sheet rock.

DETAILED DESCRIPTION OF THE INVENTION

It has been found that a new and successful process for bonding tiles to a substrate may be practiced by preparing a cementitious magnesium phosphate composition, applying said composition to the surfaces to be bonded, and then bringing together both surfaces to form a composite which sets at ambient temperatures. The tile/substrate composite sets rapidly and the resulting bond is water and fire resistant. Furthermore, the composition is non-toxic and odorless. The tiles useful in this process can generally be any of the normal commercially available tiles. For example, the tiles can be selected from the group consisting of ceramic, wood, wool and glass fiber tiles, and mixtures thereof. Particularly preferred tiles are the class of ceramic tiles.

Likewise, the substrate to which the tile is bonded can generally be any of the usual substrates encountered in this type of bonding application. For example, the substrate can be selected from the group consisting of metal, sheet rock, wood, asbestos, cement, plaster, bricks and mixtures thereof. A particularly preferred substrate is sheet rock which is in common commercial use.

The cementitious magnesium phosphate composition prepared in this process comprises an activator which is the source of phosphorus values. This activator is a composite comprising a liquid $P_2O_5$-material absorbed onto a porous material. This activator can be prepared by mixing a porous material with a liquid phosphorus pentoxide material then heating the mixture until a dry solid is produced. The dry solid can optionally be milled.

The terms "$P_2O_5$-material" is used throughout this specification to describe material containing phosphorus values. The phosphorus content of these materials is usually analyzed and expressed as $P_2O_5$, hence the term "$P_2O_5$-material".

The liquid $P_2O_5$-material can be any material containing free or available $P_2O_5$ such as green acid. This material can be selected from various industrial and agricultural chemicals and wastes. Some examples of suitable $P_2O_5$-materials include aluminum phosphate solution; ammonium phosphate solution; calcium phosphate solution; bright dip phosphoric acid from metal polishing processes; phosphoric acid; waste phosphoric acid from agricultural chemical processes; steel phosphatizing sludge acid resulting from the pickling of steel to inhibit corrosion; arsenic sulfide sludge acid resulting from the treatment of $P_2O_5$ waste streams with $H_2S$ to remove arsenic; and any combination of the above liquids.

The liquid $P_2O_5$-material can further include various acidic phosphorus compounds, e.g., orthophosphoric acid, pyrophosphoric acids and other polyphosphoric acids and their salts.

A preferred liquid $P_2O_5$-material is ammonium phosphate fertilizer solution. This fertilizer solution contains a mixture of ortho- and polyphosphates and in its original aqueous state undergoes continuous hydrolysis while standing whereby the weight ratios of the different phosphate forms keep changing, usually from high polyphosphate and low orthophosphate contents to low polyphosphate and high orthophosphate contents as the fertilizer ages. The polyphosphates of this fertilizer solution can include pyro-, tri-, tetra-, etc., phosphate species. Because of this continuous hydrolysis, magnesium phosphate cementitious compositions using liquid ammonium phosphate fertilizer by itself as the $P_2O_5$ component exhibit unpredictable qualities. Usually, when a fresh fertilizer solution is used, the cement mixture does not set at all or only forms a weak cement, and when an older fertilizer solution is used, the cement sets very rapidly with little or no working time to apply the cement. Liquid fertilizer solution upon standing precipitates hard to handle insolubles, and in cold weather the liquid freezes and gels creating more handling problems.

A particularly preferred fertilizer solution is Poly-N ® 10-34-0 ammonium polyphosphate solution supplied by Arcadian Company and used primarily as an agricultural fertilizer. A typical analysis of the Poly-N ® brand fertilizer shows 10.0 weight percent ammoniacal nitrogen and 34 weight percent total $P_2O_5$. Sixty percent of the total $P_2O_5$ is polyphosphate. The commercial product contains approximately 2 weight percent of impurities, which do not adversely affect its use in preparing the solid activator. The major impurities comprise approximately 0.5 weight percent iron, 0.5 weight percent sulfur, 0.2 weight percent magnesium (as MgO) and 0.15 weight percent of fluorine. This commercial product also contains approximately 50 weight percent water.

A preferred liquid $P_2O_5$-material is Poly-N ® 10-34-0 ammonium polyphosphate solution which has been pre-treated by adding orthophosphoric acid thereto up to about 50 weight percent of the fertilizer solution.

When the fertilizer solution is absorbed into the porous material of this invention followed by drying, the fertilizer is held in a bound form and this composition is much more thermally stable in a temperature range of from ambient to about 120° C., than the original fertilizer solution. The resulting dry solid maintains a constant phosphate distribution between the ortho- and polyphosphate species and does not hydrolyze as the original fertilizer solution would.

The porous material which can be employed in this invention includes diatomaceous earth, kieselguhr, artificially prepared porous silica, vermiculite, porous alumina, and such naturally occurring substances as various fuller's earth and clays such as bentonite, montmorillonite, acid treated clays and the like. Each porous material which may be used will exert its own specific influence upon the solid activator formed and the resulting fast-setting cementitious composition which will not necessarily be identical with that of other members of the class. Members of the class of porous material can be used separately or in combination with each other.

A preferred porous material is diatomaceous earth. The highly porous diatomaceous earth can absorb much more than 80% by weight, based on the weight of the diatomaceous earth, of a phosphate-containing liquid, e.g. liquid ammonium phosphate fertilizer solution, and absorption of 225% and above are preferred. Upon drying the diatomaceous earth with the phosphate-containing liquid absorbed therein, the solid $P_2O_5$ activator forms.

The diatomaceous earth can comprise from about 30% to about 90% by weight of the solid activator with about 30% to about 65% being preferred; can have a density of from 7.0 to 19.5 pounds/cubic foot (0.112 to 0.312 gms/cc); can have a water absorption value of from 170% to 255% by weight; and can have a surface area of from 1 to 100$M^2$/g. It is believed that when diatomaceous earth is mixed with liquid ammonium phosphate fertilizer and heated to form the dry solid activator, more than a physical entrapment of the $P_2O_5$-material occurs. It is important during the heating step that the liquid $P_2O_5$-material coats the pores of the diatomaceous earth.

The liquid $P_2O_5$-material is mixed with the porous material at ambient temperature to form at least a paste. The amount of liquid $P_2O_5$-material added is important. Amounts up to that which will fill the pores of the porous material can be used with one drying step. Amounts exceeding the pore volume of the porous material can be absorbed with several drying steps. The semi-solid, slurry or paste is heated to a temperature of from about 60° C. to about 200° C. to drive off moisture and other volatile impurities until a dry solid is produced.

The rate of heating is adjusted so that, upon drying, the pores of the porous material are not blocked with the $P_2O_5$-material, but are coated and remain available to the aqueous component when the adhesive/grout is actually being made. Sufficient porous material should be used to have enough pore volume available to absorb a suitable amount of the liquid $P_2O_5$-material. Upon drying, most of the aqueous component will be driven off, leaving solid $P_2O_5$-material deposited inside and over the walls of the microscopic pores.

The preferred porous material, diatomaceous earth, is available in various grades, i.e. natural gray or pink, calcined pink or fluxed calcined white. The fluxed calcined white grade is preferred because of the flexibility offered by the white color.

The preferred ammonium phosphate solution can contain a mixture of ortho- and polyphosphates. A convenient source for this ammonium phosphate solution is liquid fertilizer solution. The amount of ammonium phosphate solution that is mixed with the preferred diatomaceous earth is important. Sufficient ammonium phosphate solution should be used to fill the pores of the diatomaceous earth. A good indication of the sufficiency of the ammonium phosphate solution is when at least a sufficient amount of the ammonium phosphate solution is added to the diatomaceous earth to form a paste or slurry. It is therefore seen that the relative amount of solution to porous material is controlled by the porosity of the porous material. Slightly more solution than the porous material can absorb is used. The mixing of diatomaceous earth and the ammonium phosphate solution is carried out at ambient temperatures.

The resulting preferred mixture of diatomaceous earth and ammonium phosphate solution is then heated to drive off water and other volatiles leaving various ammonium phosphate species coated onto the pores of the diatomaceous earth. The rate of heating must be sufficient to achieve the above effect and can range from about 60° C. to about 200° C. The heating is discontinued after a dry solid results. This dry solid is then milled to yield the activator, the source of phosphorous values in the magnesium phosphate composition. The milled material usually has a particle size range of from about 100–325 mesh and a surface area of from 1–10 square meters per gram.

This activator is then blended with magnesium oxide, diammonium phosphate and boric acid to form the cementitious magnesium phosphate composition. Sufficient water is then added to this composition to form a paste prior to its application.

The magnesium phosphate cementitious composition of this invention can comprise from about 50 to about 80 weight percent of the activator, from about 20 to about 40 weight percent of magnesium oxide, from about 1 to about 10 weight percent of diammonium phosphate and from about 0.1 to about 5 weight percent of boric acid. A particularly preferred composition comprises 65 weight percent activator, 29 weight percent magnesium oxide, 5 weight percent diammonium phosphate and 1 weight percent boric acid. The composition can be extended with inert materials, e.g. fibers, rocks, sand and other aggregates, without affecting its performance.

After the cementitious magnesium phosphate composition is prepared, it is applied to the surfaces to be bonded, i.e. the surface of either the tiles or the substrate or both. Thereafter, the surface or surfaces containing the magnesium phosphate composition thereon is brought together to form a composite. This composite is allowed to set at ambient temperatures for about 1 to 3 hours with the result that the tiles are firmly bonded to the substrate. The grout/adhesive usually hardens in less than 1 hour, however, the resulting bond does not usually become durable until about 1 to 3 hours. This tiled surface can then resist water, flame and pressure.

The following experiments describe certain embodiments of the invention. Other embodiments will be apparent to one of ordinary skill in the art from a consideration of this specification or practice of the invention disclosed therein. It is intended that the specifications and Experiments be considered as exemplary only, with the true scope and spirit of the invention being indicated by the claims which follow the experiments.

EXPERIMENT 1

900 grams of ammonium phosphate fertilizer solution type 10-34-0 Poly-N ® brand supplied by Arcadian Corporation was mixed with 400 grams of diatomaceous earth type Kenite ® 300 supplied by Witco Chemical Corp. to form a paste. This paste was dried for 16 hours at 120° C. The resulting dry solid was milled to allow 60 weight percent to pass through 200 mesh to form an activator.

65 weight percent of this activator, 29 weight percent of white MgO, 5 weight percent of diammonium phosphate, and 1 weight percent of boric acid was blended into a stable white powder. This is the grout/adhesive product. This white powder was mixed, 100 parts by weight with 25 parts by weight of water, for 3 minutes into a paste.

This paste was used to bond ceramic tiles to wood, sheet rock and cement floors and walls. The working time of the paste was about 30 minutes. The paste was applied to, e.g., the wood substrate in a layer of about 0.1 to 0.2 millimeter thick. The tile was then applied over the wet paste and hand pressed. Next, an epoxy adhesive was applied to the glazed-surface side of the tile to affix it to a metal dolly. The epoxy used was a Sikadur 31 ® brand component A and B from Sika Corp. The dolly was then attached to a Zorelco Elcometer instrument to measure pull strength at the breaking point of the bond between the tile and the substrate in pounds per square inches. Table I below summarizes the bond strengths achieved and compares them with other commercially available adhesives.

TABLE I

| BOND STRENGTH OF CERAMIC TILES TO WOOD | | | |
|---|---|---|---|
| | BOND STRENGTH OF ADHESIVE, PSI | | |
| TIME | NEW COMPOSITION | COMMERICAL A[1] | ADHESIVE B[2] |
| 3 Hr. | 165 | 0 | 400 |
| 6 Hr. | 165 | 0 | 400 |
| 24 Hr. | 350 | 110 | 400 |
| 30 Hr. | 400 | 250 | 500 |

[1]Ceramic And Mosaic Floor Tile Adhesive, Bond-All No. 600 brand of commercial adhesive supplied by Pergament.
[2]Devcon 5 Minute ® Epoxy brand of epoxy supplied by Devcon Ltd., Ontario, Canada.

The above Table demonstrates that the new composition of this invention exhibits acceptable bond strengths when used to bond ceramic tiles to wood. In fact, it is noted that the resulting bond strengths are superior to that realized using a commercial adhesive from Pergament and that after approximately 1 day the bond strength of the new composition is comparable with that of the 5 minute epoxy adhesive.

Furthermore, both commercial adhesives exhibited unpleasant odors, whereas this new composition was odorless. Pergament recommends the use of a grout in addition to its adhesive for household applications. Our material acts as both a grout and an adhesive.

EXPERIMENT 2

The white grout powder described in Experiment 1 was mixed with 25% its weight water and stirred for 3 minutes. It was then used to bind ceramic tiles, 0.87 square inch, to a portland cement substrate. After 3 hours, the bond strength between the tile and cement surface was measured as described in Experiment 1 and found to be 165 psi.

What is claimed is:

1. A process for bonding tiles to a substrate which comprises:
   (a) preparing a cementitious magnesium phosphate composition comprising:
      (i) an activator prepared by mixing an inert porous material with a sufficient amount of a liquid $P_2O_5$-material to at least form a paste followed by heating the resulting material to yield a dry solid;
      (ii) a source of magnesium;
      (iii) sufficient water to form a paste;
   (b) applying the magnesium phosphate composition to either the tile or substrate, or both; and then
   (c) bringing together the tile and substrate with the cementitious composition therebetween to bond the tile to the substrate and allowing the cementitious composition to set at ambient temperatures.

2. The process of claim 1 wherein the tile is selected from the group consisting of ceramic, wood, wool and glass fiber tiles, and mixtures thereof.

3. The process of claim 1 wherein the substrate is selected from the group consisting of metal, sheet-rock, wood, asbestos, cement, plastic, bricks, and mixtures thereof.

4. The process of claim 1 which further comprises the step of adding boric acid to the cementitious magnesium phosphate composition.

5. A process for bonding tiles to a substrate which comprises:
   (a) preparing a cementitious magnesium phosphate composition comprising:
      (i) an activator prepared by mixing diatomaceous earth with at least a sufficient amount of an ammonium phosphate solution to form a paste then heating the paste to coat the pores of the diatomaceous earth and result in a dry solid which is then milled to yield the activator;
      (ii) magnesium oxide,
      (iii) diammonium phosphate,
      (iv) boric acid, and
      (v) sufficient water to form a paste;
   (b) applying the magnesium phosphate composition to the surfaces to be bonded; and then
   (c) bringing together both surfaces to form a composite which is allowed to set at ambient temperatures.

6. The process of claim 5 wherein the tile is selected from the group consisting of ceramic, wood, wool and glass fiber tiles, and mixtures thereof.

7. The process of claim 6 wherein the prepared magnesium phosphate cementitious composition comprises from about 50 to about 80 weight percent of the activator, from about 20 to about 40 weight percent of magnesium oxide, from about 1 to about 10 weight percent of diammonium phosphate and from about 0.1 to about 5 weight percent of boric acid.

8. The process of claim 6 wherein the substrate is selected from the group consisting of metal, sheet-rock, wood, asbestos, cement, plaster, bricks and mixtures thereof.

9. The process of claim 7 wherein the substrate is selected from the group consisting of metal, sheet-rock, wood, asbestos, cement, plaster, bricks, and mixtures thereof.

10. The process of claim 9 wherein the tile is ceramic, the substrate is sheet-rock, and wherein the prepared magnesium phosphate cementitious composition comprises 65 weight percent activator, 29 weight percent magnesium oxide, 5 weight percent diammonium phosphate and 1 weight percent boric acid.

* * * * *